(12) United States Patent
Nichols et al.

(10) Patent No.: US 11,125,154 B2
(45) Date of Patent: Sep. 21, 2021

(54) CENTRIFUGAL IMPELLER FOR GAS TURBINE ENGINE

(71) Applicant: PRATT & WHITNEY CANADA CORP., Longueuil (CA)

(72) Inventors: Jason Nichols, Mississauga (CA); Ignatius Theratil, Mississauga (CA); Mohammadreza Amiralaei, Vaughan (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 37 days.

(21) Appl. No.: 16/674,368

(22) Filed: Nov. 5, 2019

(65) Prior Publication Data

US 2021/0123378 A1   Apr. 29, 2021

Related U.S. Application Data

(60) Provisional application No. 62/926,234, filed on Oct. 25, 2019.

(51) Int. Cl.

| | |
|---|---|
| *F02C 3/10* | (2006.01) |
| *F02C 7/264* | (2006.01) |
| *F01D 5/04* | (2006.01) |
| *F01D 5/12* | (2006.01) |
| *F04D 29/24* | (2006.01) |
| *F04D 29/30* | (2006.01) |
| *F04D 29/28* | (2006.01) |

(52) U.S. Cl.
CPC ............. *F02C 3/103* (2013.01); *F01D 5/04* (2013.01); *F01D 5/043* (2013.01); *F01D 5/048* (2013.01); *F02C 7/264* (2013.01); *F04D 29/28* (2013.01); *F04D 29/284* (2013.01); *F05D 2220/32* (2013.01); *F05D 2240/24* (2013.01)

(58) Field of Classification Search
CPC . F01D 5/04; F01D 5/043; F01D 5/048; F04D 29/28; F04D 29/248; F04D 29/30; F05D 2240/301

See application file for complete search history.

(56) References Cited

U.S. PATENT DOCUMENTS

| | | | |
|---|---|---|---|
| 7,517,193 B2 | 4/2009 | Higashimori | |
| 8,951,009 B2 | 2/2015 | Swiatek et al. | |
| 10,253,633 B2* | 4/2019 | Klaus | F01D 5/141 |
| 2005/0260074 A1* | 11/2005 | Higashimori | F04D 21/00 |
| | | | 415/206 |
| 2012/0301287 A1* | 11/2012 | Swiatek | F04D 29/284 |
| | | | 415/204 |

* cited by examiner

*Primary Examiner* — Woody A Lee, Jr.
*Assistant Examiner* — Brian O Peters
(74) *Attorney, Agent, or Firm* — Norton Rose Fulbright Canada LLP

(57) ABSTRACT

The centrifugal impeller can have a hub and a plurality of blades, each of the blades having a span extending from the hub to a tip edge, camber lines extending from an inlet edge to an outlet edge between two opposite faces, including a tip camber line extending along the tip edge and a 50% span camber line extending at 50% of the span, a thickness extending between opposite faces of each blade, the tip edge having, at a location corresponding to 5% of the tip camber line, less than 15% of the maximum thickness, each of the blades having, along the 50% span camber line, a thickness reaching at least 58% of the maximum thickness and then reducing by at least 5% of the maximum thickness within 10% of the length of the 50% span camber line.

19 Claims, 5 Drawing Sheets

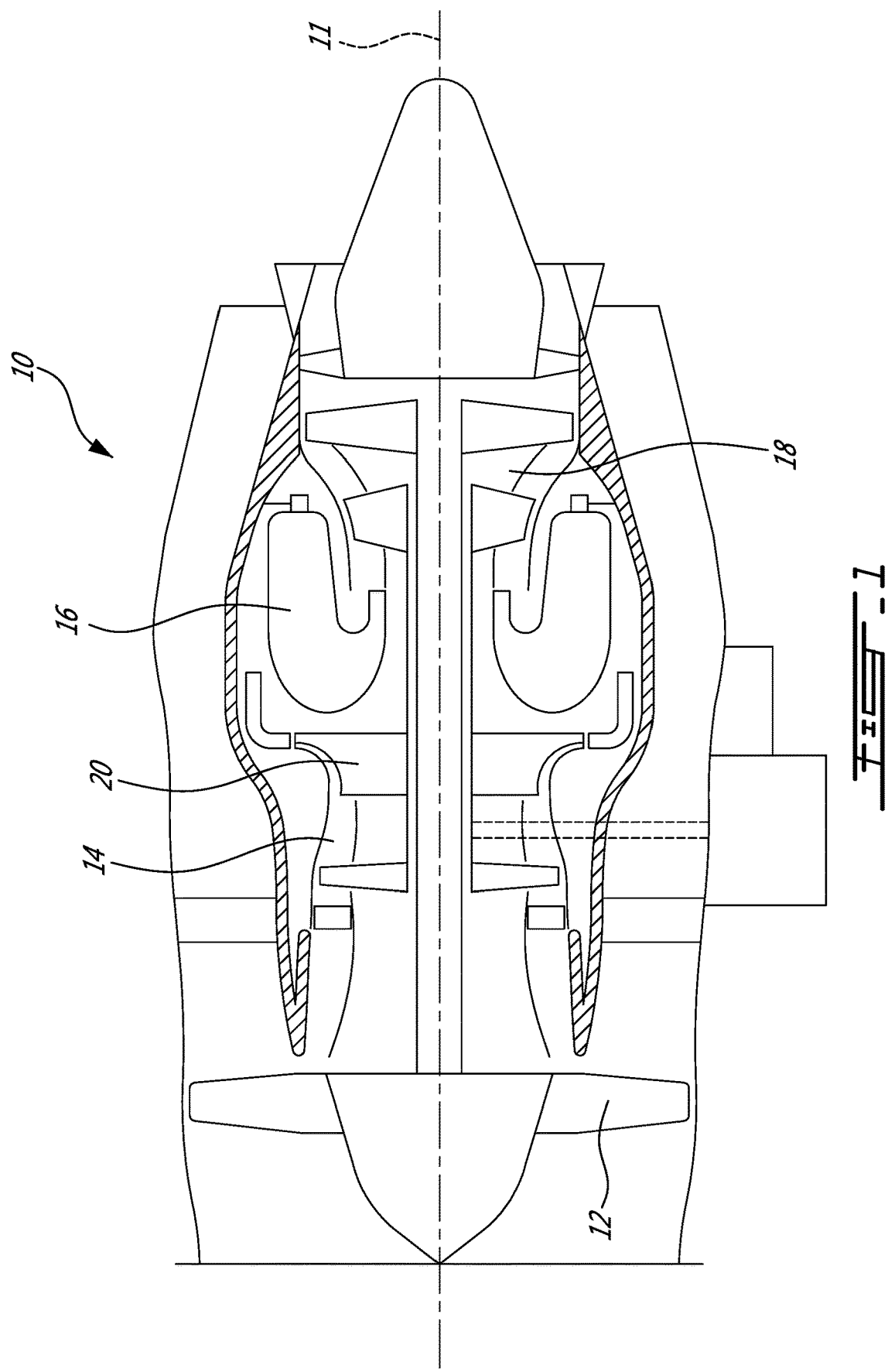

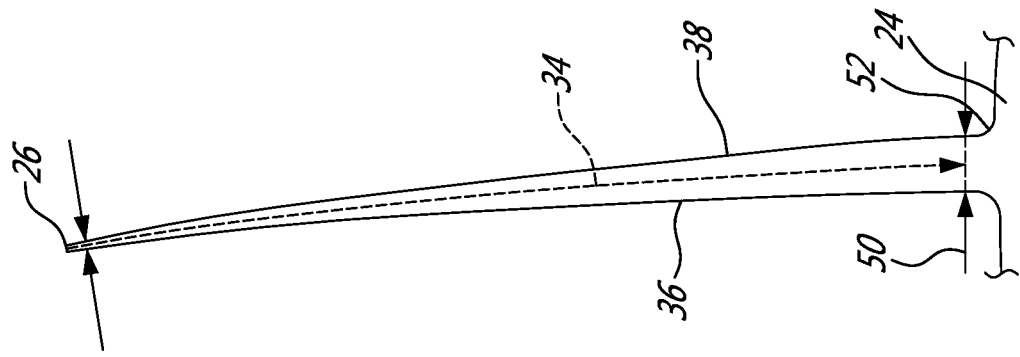
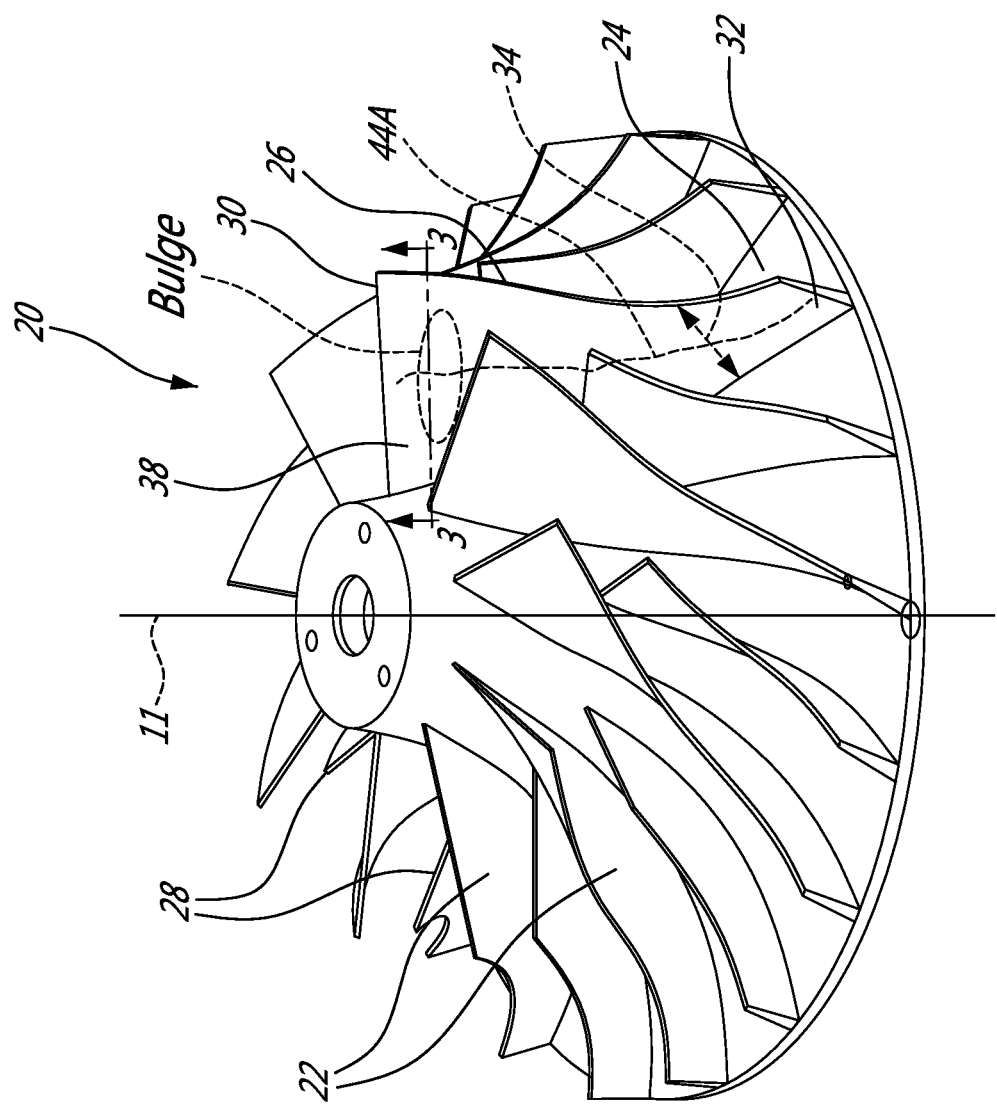

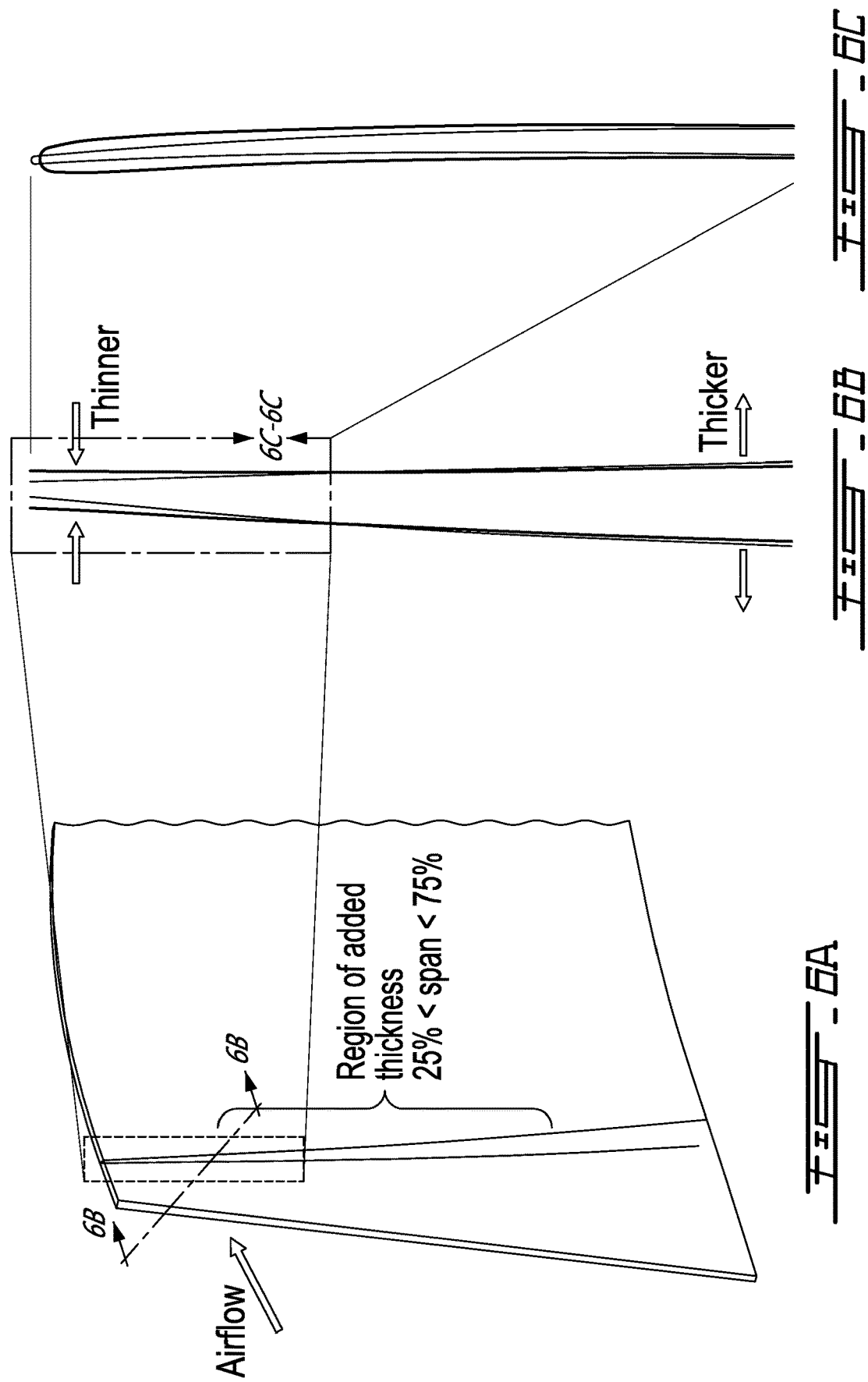

CENTRIFUGAL IMPELLER FOR GAS TURBINE ENGINE

TECHNICAL FIELD

The application related generally to gas turbine engines and, more particularly, to centrifugal compressors therefore.

BACKGROUND OF THE ART

Centrifugal impellers in gas turbine engines receive several different sources of design pressure and must meet various requirements. Compression efficiency, structural resistance, weight, durability, are amongst the design considerations. Although existing centrifugal impellers were satisfactory to a certain degree, there remained room for improvement.

SUMMARY

In one aspect, there is provided a centrifugal impeller comprising a hub and a plurality of blades extending from an axial inlet to a radial outlet and circumferentially interspaced from one another, each of the blades having a span extending from the hub to a tip edge, camber lines extending from an inlet edge to an outlet edge between two opposite faces, including a tip camber line extending along the tip edge and a 50% span camber line extending at 50% of the span, a thickness extending between opposite faces of each blade, a maximum thickness at a maximum thickness location adjacent the hub, the tip edge having, at a location corresponding to 5% of the tip camber line, less than 15% of the maximum thickness, each of the blades having, along the 50% span camber line, a thickness reaching at least 58% of the maximum thickness and then reducing by at least 5% of the maximum thickness within 10% of the length of the 50% span camber line.

In another aspect, there is provided a gas turbine engine comprising in serial flow communication a compressor section for pressurizing air, a combustor in which the compressed air is mixed with fuel and ignited for generating an annular stream of hot combustion gases, and a turbine section for extracting energy from the combustion gases, the compressor section having a centrifugal impeller comprising a hub and a plurality of blades extending from an axial inlet to a radial outlet and circumferentially interspaced from one another, each of the blades having a span extending from the hub to a tip edge, camber lines extending from an inlet edge to an outlet edge between two opposite faces, including a tip camber line extending along the tip edge and a 50% span camber line extending at 50% of the span, a thickness extending between opposite faces of each blade, a maximum thickness at a maximum thickness location adjacent the hub, the tip edge having, at a location corresponding to 5% of the tip camber line, less than 15% of the maximum thickness, each of the blades having, along the 50% span camber line, a thickness reaching at least 58% of the maximum thickness and then reducing by at least 5% of the maximum thickness within 10% of the length of the 50% span camber line.

In a further aspect, there is provided a centrifugal impeller comprising a hub and a plurality of blades extending from an axial inlet to a radial outlet and circumferentially interspaced from one another, each of the blades having a span extending from the hub to a tip edge, camber lines extending from an inlet edge to an outlet edge between two opposite faces, including a tip camber line extending along the tip edge, wherein the tip edge continuously increases in thickness by at least 5% of the max thickness within a portion of the first 10% of the length of the tip camber line, the portion having at least 4% of the length of the tip camber line.

DESCRIPTION OF THE DRAWINGS

Reference is now made to the accompanying figures in which:

FIG. 1 is a schematic cross-sectional view of a gas turbine engine;

FIG. 2 is an oblique view of a centrifugal impeller, in accordance with an example, FIG. 3 is a cross-sectional view taken across a blade, along cross-section lines 3-3 of FIG. 2;

FIG. 6A is an oblique view of a portion of a blade in accordance with an example, with FIG. 6B being a cross-section taken along lines 6B-6B of FIG. 6A, and FIG. 6C showing the corresponding portion of FIG. 6B enlarged.

DETAILED DESCRIPTION

Figure 4:
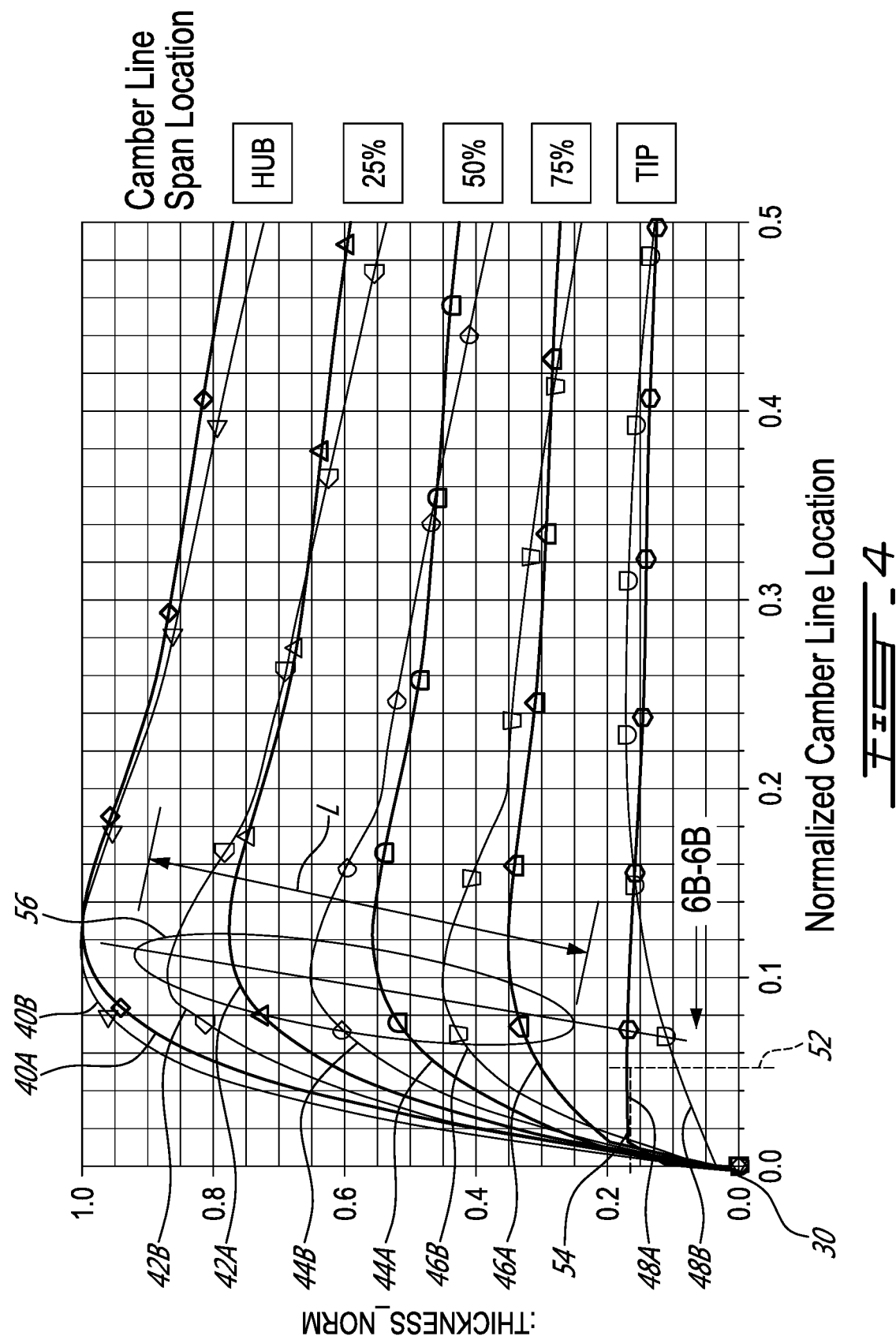
FIG. 4 is a graph plotting blade thickness along 5 camber lines, comparing two blade profiles.

FIG. 1 illustrated a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases, with the rotary components rotating around a main axis 11.

FIG. 2 shows an example of a centrifugal impeller 20 which can form part, for instance, of a compressor section of a gas turbine engine such as the one shown in FIG. 1.

Centrifugal impellers 20, and especially those used gas turbine engines 10, receive several different sources of design pressure and must meet various requirements. Compression efficiency, structural resistance, weight, durability, are amongst the design considerations. Efficiency is mainly driven by aerodynamic considerations, and motivates thinning of the tip edge because a thinner tip can lead to better aerodynamic performance. Structural resistance is an important factor, and is typically addressed by increasing thickness, and in practice, several dynamic effects should also be taken into consideration, such as blade flutter/flapping for instance, or other frequency tuning factors, which can also motivate the addition of thickness. Yet another design pressure is foreign object damage (FOD) tolerance, particularly in the leading edge region of the blades.

The thickness distribution configuration along the blade profile (length and span) can be a key factor in improving centrifugal impeller design in a manner to meet and surpass existing requirements. Indeed, it was found that the needs of aerodynamic performance could be addressed while satisfying or surpassing other existing performance indicators by strategically distributing the thickness of the blade profile. This will be illustrated in reference to a comparative example of blade thickness maps presented in FIG. 4, but first, since centrifugal impellers 20 have complex shapes, with the blades having complex 3-dimensional spiralling and bending profiles, some reference language will be introduced in reference to FIGS. 2 and 3. Indeed, aerodynamic losses can motivate thinner blades especially when operating in transonic flow regimes. It can be strategic to keep the tip thickness to a minimum as that is where the maximum relative Mach numbers exist. On the contrary, thicker sections can also be needed to increase the FOD durability and frequency tuning. The leading edge thickness distribution needs to be optimized to meet aero, structural and dynamic requirements. It can also be strategic for blade thickness distribution to be guided by the strain energy in the blade Accordingly, FIG. 2 presents an example of a centrifugal impeller 20. The centrifugal impeller 20 has a plurality of blades 22 which can be identical to one another (although some impellers can have mis-tuned airfoils that are not identical, or two or more sets of airfoils having different geometries) and circumferentially interspaced from one another around the main axis 11. The blades 22 extend from the hub 24 across the gas path, and a free, tip edge 26 of the blades 22 can be designed to be adjacent a portion of the engine casing which is typically referred to as the compressor shroud. Accordingly, the gas path is delimited on one side by the hub 24, and on the other side by the compressor shroud. The gas path has a complex annular shape which elbows from an axial compressor inlet to a radial compressor outlet. In this specific example, the centrifugal impeller 20 includes two distinct sets of blades which are circumferentially interspersed with one another, a main set including a first plurality of blades 22 which extends fully from the inlet to the outlet, and an auxiliary set including a second plurality of blades 28 which extend from the inlet partially to the outlet. The main set of blades 22 will be used in the following discussion for the purpose of providing an example. Dimensions of centrifugal impellers 20 can vary depending, among other factors, on the size of the engines which they are designed for. Accordingly, normalized virtual references will be defined and used herein in a manner to refer to centrifugal impellers 20 independently of the exact size of their various embodiments.

The edge of the blades 22 of the main set which coincide with the inlet of the compressor will be referred to herein as the leading edge 30, or inlet edge, and by contrast, the edge of the blades which coincides with the outlet of the compressor will be referred to as the trailing edge 32, or outlet edge. A span 34 of the blades 22 extends from the hub 24 to the tip edge 26, generally normal to the hub 24 (in practice, the blade, and thus the span, will typically curve away from a theoretical line which would be perfectly normal to the hub as shown in FIG. 3, and the direction in which the span curves away from this theoretical line can even vary along the length of the blade). The span 34, or imaginary lines oriented along the span, can be used as normalized virtual references for the purpose of the following discussion. Accordingly, portions of the blades 22 located adjacent the hub 24 can be referred to as 0% span, portions of the blades 22 located adjacent the tip edge 26 referred to as 100% span, and intermediate portions of the blades 22 referred to as a function of the percentage of the dimension of the span from the hub 24 to the tip edge 26, such as 25% span, 50% span, 75% span for instance, as best shown in the example presented in FIG. 3.

Returning to FIG. 2, the blades each have a body having two opposite faces 36, 38, and can curve and slope in various ways. One of these ways is that the outlet edge 32 can be circumferentially offset from the inlet edge 30 by a given circumferential distance, or angle, and can thus be considered to slope relative to an axially/radially oriented plane, in addition to having an elbow shape projection within that plane. Camber lines can be used as additional virtual references for the purpose of the following discussion. Camber lines can be defined as extending at the middle of the thickness of the blade, between the two opposite faces 36, 38, at a given percentage of the span's dimension, from the inlet edge 30 to the outlet edge 32. Accordingly, a tip edge camber line 40A (see FIG. 4) can be said to extend along the tip edge 26, a hub camber line 48A can be said to extend along the hub 24, and 25% span, 50% span, 75% span camber lines 42A, 44A, 46A, for instance, can be said to extend along the 25% span line (the line extending from leading edge to outlet edge always at 25% of the local span), 50% span line, and 75% span line, for instance. Relative positions along those camber lines 40A, 42A, 44A, 46A, 48A can be defined as a function of the percentage of the length of the corresponding camber line, from leading edge 30 to trailing edge, and used to form yet another normalized virtual reference. For instance, a position located at a midpoint of the 50% span camber line 44A can be referred to as being at 50% of the 50% span camber line's length.

Similarly, the thickness of the blade 22 at any point along span 34 or camber 44A can be normalized by building a scale relative to the maximum thickness 50. The location of maximum thickness 50 will typically be a point along the hub camber line 40A, and typically within the first 30% of the length of the hub camber line 40A, and the blades can narrow progressively along their span 34 to the tip edge 26 as shown in FIG. 3. For the sake of defining a useful reference, any fillet will be excluded from the measurement of the maximum thickness 50, and the maximum thickness 50 will be measured immediately above any such fillet 52. Indeed, a fillet 52 in the form of a curved surface having given radius to avoid stress concentrations is used between the blades 22 and the hub 24 in many types of centrifugal compressors 20. Similarly, the tip edge 26 can be slightly rounded rather than perfectly flat, and measuring the thickness of the tip edge 26 at any point on the rounded tip will be rejected. Rather, the thickness of the tip can be measured immediately below any rounded tip, if a rounded rather than a square tip is present. Otherwise said, the thickness of the tip will be measured below any relatively small radius present between a face 36 of the blade and the tip edge 26, and in a region where the changes in thickness are relatively slow along the span, such as less than 10% change in thickness along 3% of the span for instance, and definitely a lot slower than the rate of change of thickness which can occur in a relatively sharp roundness or radius which may be present at the tip edge 26. Another way of avoiding any tip edge radius or roundness bias to a measurement of tip thickness is to measure tip thickness a given distance from the tip edge, such as at 97%, or 95% of the span, for instance, and even though this measurement may not be perfectly indicative of the smallest tip thickness occurring before a rounded tip, the difference will likely be negligible.

By using the normalized references introduced above, one can draw a normalized thickness map across span 34 and camber 44A for the blades 22 of many shapes and sizes of centrifugal impellers 20. An example of such a normalized thickness map is presented in FIG. 4.

The thickness maps of two example impeller blades are presented in FIG. 4: a first impeller blade, and a second impeller blade. The first impeller blade is represented by thickness mapping along camber lines 40A, 42A, 44A, 46A and 48A, whereas the second impeller blade is represented by the thickness mapping along camber lines 40B, 42B, 44B, 46B, 48B. The distinction between the thickness distribution of the two impeller blades can be perceived by comparing the relative, normalized, thicknesses, on a scale of 0.0:1 to 1.0:1 ratio relative to the maximum thickness along the Y axis. For each one of the two impellers, five camber lines are presented, including a hub camber line 40A, 40B, a 25% span camber line 42A, 42B, a 50% span camber line 44A, 44B, a 75% span camber line 46A, 46B and a tip edge camber line 48A, 48B, and positions along those camber lines are represented in a normalized manner by representing them as a ratio of 0.0:1 to 0.5:1 (only half the length of the camber lines are shown in this graph) relative to the entire length of the corresponding camber lines, along the X axis.

Two significant distinctions can be perceived by comparing the thickness maps of the two impeller blades. Firstly, the tip edge 48B of the second impeller blade is significantly narrower than the tip edge 48A of the first impeller blade in the first 12% of the tip camber line's length. Secondly, there is a localized increase in maximal thickness reached in the mid-span portion, or otherwise said, the "bulge" of increasing and decreasing thickness which can be formed around the area of maximum thickness is significantly more pronounced in the mid-span region in the second impeller blade than in the first impeller blade. These two distinctions will now be discussed in greater detail.

As presented above, reducing thickness at the tip edge 26 can be interesting from the point of view of aerodynamics, but can be limited by considerations associated to structure (static or dynamic, e.g. frequency tuning or FOD resistance). In the redistribution of thickness which occurs between the two impeller examples shown in FIG. 4, it was found possible to compensate removal of thickness at the tip, from the structural point of view, by moving some of that removed thickness to the bulge, a modification which can be referred to as barrelling of the impeller blade, or more specifically barrelling in the region of the bulge, for convenience. Indeed, it will be noted that the thickness of the first impeller tip edge at 5% of the length of the tip edge camber line 48B (i.e. at imaginary vertical line 52 meeting position 0.05 along the X axis) is of about 17% of maximum thickness (i.e. at imaginary horizontal line 54 meeting position 0.17 along the Y axis). By contrast, the thickness of the second impeller tip edge at the same normalized 5% tip edge camber line 48A location is significantly lower. It will also be noted that by contrast with the thickness of the tip edge of the first impeller which is relatively constant and even decreases in the same region, the thickness of the tip edge of the second impeller continuously increases in thickness within a significant portion of the first 10% of the length of the tip camber line 48B.

The extent to which the impeller tip edge 26 is thinned, or continuously increases in thickness within a significant portion of the first 10% of the length of the tip camber line 28B, can vary from one embodiment to another. Such changes can be motivated by variations in the impeller size and the exact purpose of the given impeller design, for instance, and examples of possible alternate embodiments will be exposed in relation with FIG. 5 further below. However, for now, it can be noted that in alternate embodiments, the thickness of the tip edge at the 5% tip edge camber line 48B location 52 can be below 15% of max thickness, below 12% of max thickness, and even perhaps below 10% of maximum thickness in some embodiments. Similarly, the increase in thickness along the portion of the tip edge camber line 48B which occurs in the first 10% of the tip camber line 48B can be of at least 5% of maximum thickness, and even perhaps 10% of maximum thickness, along a portion of the tip edge camber line 48B having at least 4% of the tip edge camber line length, perhaps even at least 6%.

The extent at which the mid-span bulge 56 is sharpened by added material, and the exact position and orientation of the mid-span bulge 56, can vary from one embodiment to another. Such changes can be motivated by variations in the impeller size and the exact purpose of the given impeller design, for instance, and examples of possible alternate embodiments will be exposed in relation with FIG. 6 further below. However, for now, it can be noted that several features can assist in structurally compensating for thickness removed from the tip edge 26. Typically, it will be desired to sharpen the bulge at least along the 50% span line 44B, and the sharpening of the bulge 56 can extend along a significant portion of the span, such as extending past the 25% span line 42B, extending past the 75% span line 46B, or both the 25% span line 42B and the 75% span line 46B. Indeed, in embodiments where FOD tolerance is a concern, it can be preferred to add thickness on the high strain energy locations, and it can be preferred to add thickness in the 50%-75% span region. In embodiments where dynamic structural effects are a concern (e.g. tip flutter/frequency tuning), it can be desired to add thickness closer to the hub, such as around the 25% span line region or in the 25%-50% span region. In embodiments where both FOD tolerance and dynamic structural effects are concerns, it can be preferred to add thickness along a greater portion of the span, such as exceeding the 25% and 75% span lines 42B, 46B.

Sharpening of the bulge 56 can involve both increasing the maximum thickness along the corresponding span lines (e.g. 42B, 44B, 46B), and also thinning the blade more sharply after the point of maximum thickness along the corresponding span line. Indeed, in the example presented in FIG. 4, for instance, the maximum thickness along the 50% span line 44B reaches 70% of max thickness for the second impeller blade, by contrast with about 56% of max thickness for the first impeller blade. However, within 8% normalized camber line after the maximum camber line thickness, the thickness of the second impeller blade has returned relatively close to the corresponding thickness of the first impeller blade. Accordingly, not only can the extent of the corresponding camber line's maximum thickness be used to distinguish the second impeller from the first, but the rate and extent at which the thickness decreases after the camber line's point of maximum thickness can also potentially serve as distinguishing factors. For now, it can be said that in alternate embodiments, along the 50% span camber line 44B, the thickness can reach at least 58% of max thickness, perhaps even 63% max thickness, or more, and the subsequent reduction in thickness can be of at least 5%, perhaps even at least 8% of the maximum thickness, and occur within 10%, and perhaps even within 8%, of the length of the 50% span camber line. In alternate embodiments, along the 25% span camber line 42B, the thickness can reach at least 80% max thickness, perhaps even at least 85% max thickness or more, and the subsequent reduction in thickness can be of at least 5% of the maximum thickness, perhaps even 8% of the maximum thickness, and occur within 6%, perhaps even 4% of the length of the 25% span camber line. In alternate embodiments, along the 75% camber line 46B, the thickness can reach at least 38% of the maximum thickness, perhaps even 42% or more, and the subsequent reduction in thickness can be of at least 5%, perhaps even at least 7%, within 10%, perhaps even 8%, of the length of the 75% span camber line.

In alternate embodiments, the sharpened bulge 56 can have an elongated shape generally extending in the orientation of the span 34, and can extend along 30%, 40%, 50% or more of the span 34. The sharpened bulge 56 can generally be followed by a reduction in thickness of at least 5% of the maximum thickness of the blade within 8% of the length of the corresponding camber lines, along the entire length L of the bulge 56. The position and orientation of the sharpened bulge 56 in the specific case of the second impeller blade is generally represented by the oval shape marked on the graph of FIG. 4.

Figure 5:
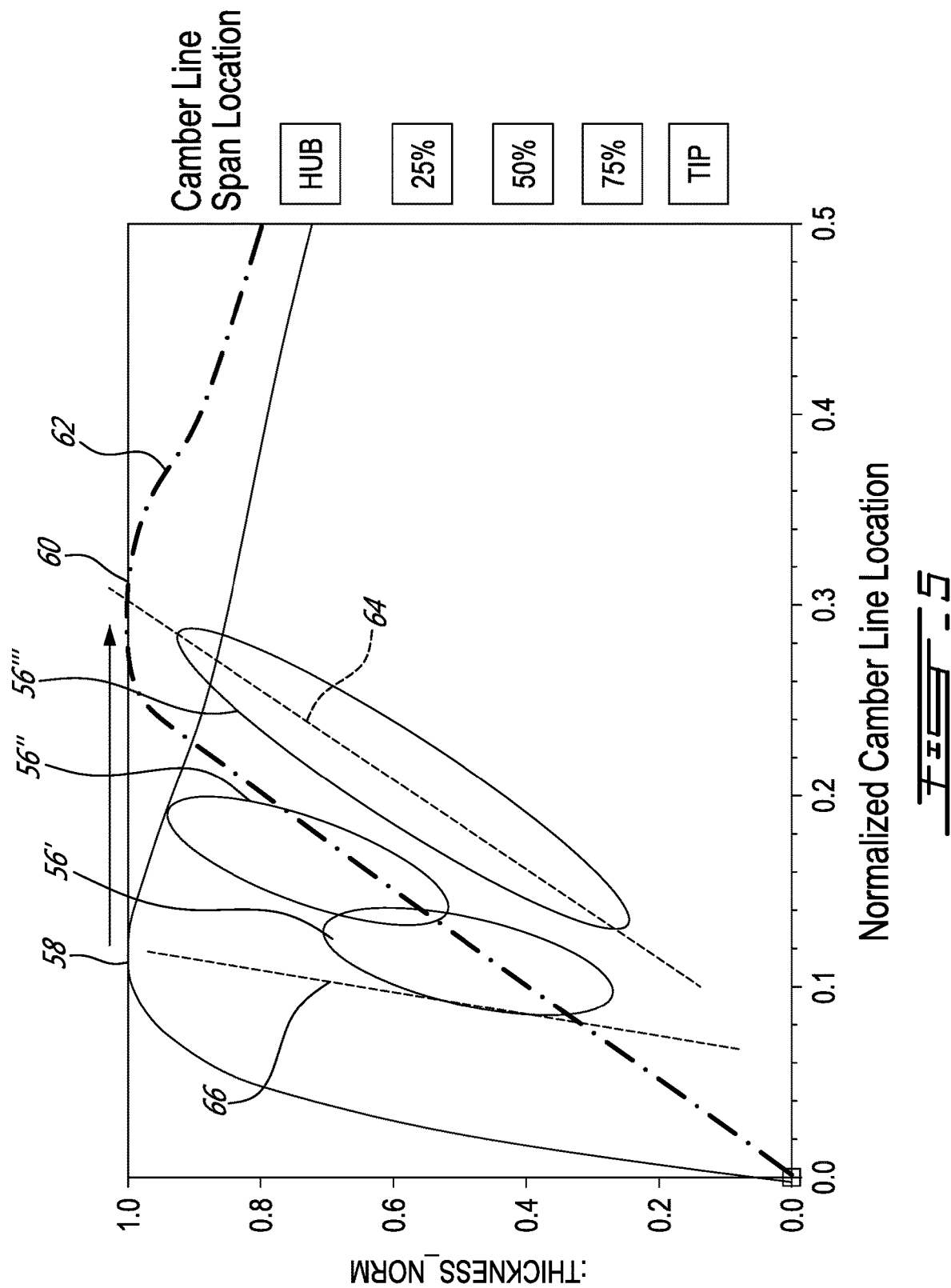
FIG. 5 is a graph plotting example variants of the example blade profile shown in FIG. 4.

Depending on the embodiment, the exact position and orientation of the bulge 56 along the span 34 and camber 44B of the blades 22 can vary. This will now be discussed in relation with FIG. 5, where alternate possible oval shapes representing the sharpened bulge 56', 56", 56''' are shown. Indeed, the impeller blade used for the example plotted in FIG. 4 was designed with a point of maximum thickness 58 located at around 12% of the hub span line, but alternate impeller blades can be designed with a point of maximum thickness 60 located at different relative locations around the hub span line, which can significantly affect the position and orientation of the sharpened bulge 56', 56", 56'''. In FIG. 5, for instance, an alternate example of a blade hub line thickness map is provided, representing a third blade. The point of maximum thickness 60 of the third blade can be seen to be at roughly 30% of the hub camber line 62, and the position and orientation of the sharpened bulge 56''' is affected, as schematized by the corresponding oval shape. To prevent tip flutter, it can be preferred for the bulge to be located close to the beginning of the camber line, around the 75% span location, and for this reason, it can be preferred to maintain the position of the bulge closer to the beginning of the 75% camber line (e.g. 46B) even in scenarios where the max blade thickness is located further out, such as 20 or 30% of hub camber line length, for instance. This can lead to a scenario where the sharpened bulge of blades having a max blade thickness located further out can have a lesser slope 64, as plotted against the X and Y axes of FIG. 5, than the slope 66 of the sharpened bulge of blades having a max blade thickness located closer in, such as around 10% of hub camber line, for instance. Accordingly, in alternate embodiments, the maximum thickness location 58, 60 can be between 5% and 30% of the hub camber line 62, 40B, and further between 10 and 25% of the hub camber line, and accordingly, the portion of the blade 22 which reaches the maximum thickness of the bulge at the 50% camber line can be within about 20% of the hub camber line, or within 15% of the hub camber line, for instance, depending, among other factors, on the location of the point of maximum thickness. Indeed, using added thickness in the form of a continuous, elongated bulge, can be preferred for structural reasons to providing the added thickness in a discontinuous manner. A continuous, elongated bulge can have the structural effect akin to a beam or other structural member.

The first and second blades represented in the thickness mapping of FIG. 4 are shown in greater detail in FIGS. 6A, 6B and 6C. It will be seen that these blades have a tapered blade shape where the thickness continually reduces when moving along the span from the hub to the tip. As schematically represented in FIG. 6B, the second blade can be thinner than the first blade along the tip, and thicker in the mid-span region.

Alternate embodiments can target the following goals: 1) Maintain FOD tolerance relative to a baseline blade; 2) Reduce thickness at the tip to improve aerodynamics/achieve lower losses due to high Mach numbers; 3) Reduce root stress via reduction in blade thickness at max radius; 4) Increase modal frequencies to push modes out of the engine running range.

The above description is meant to be exemplary only, and one skilled in the art will recognize that changes may be made to the embodiments described without departing from the scope of the invention disclosed. For example, the thinner tip and sharpened bulge can be applied to the impellers of other gas turbine engine than turbofans. Still other modifications which fall within the scope of the present invention will be apparent to those skilled in the art, in light of a review of this disclosure, and such modifications are intended to fall within the appended claims.

The invention claimed is:

1. A centrifugal impeller comprising a hub and a plurality of blades extending from an axial inlet to a radial outlet and circumferentially interspaced from one another, each of the blades having two opposite faces, a span extending from 0% at the hub to 100% at a tip edge, camber lines extending from 0% at an inlet edge to 100% at an outlet edge, midway between the two opposite faces, including a tip camber line extending along the tip edge and a 50% span camber line extending at 50% of the span, the two opposite faces of each blade defining a thickness therebetween, a blade of the plurality of blades having a maximum thickness at a maximum thickness location adjacent the hub, the tip edge having, at a location corresponding to 5% of the tip camber line, less than 15% of the maximum thickness, the blade having, along the 50% span camber line, a thickness reaching at least 58% of the maximum thickness at a first location along the 50% span camber line, the thickness reducing by at least 5% of the maximum thickness at a second location along the 50% span camber line, the first location and the second location spaced apart 10% of a length of the 50% span camber line.

2. The centrifugal impeller of claim 1 wherein a reduction in the thickness along the 50% span camber line is of at least 8%.

3. The centrifugal impeller of claim 1 wherein a reduction in thickness along the 50% span camber line occurs within 8% of the length of the 50% span camber line.

4. The centrifugal impeller of claim 1 wherein along the 50% span camber line, the thickness reaches at least 63% of the maximum thickness.

5. The centrifugal impeller of claim 1 wherein a maximum thickness along the 50% span camber line is reached at a location between 5% and 25% of the 50% span camber line.

6. The centrifugal impeller of claim 1 wherein the tip edge has less than 12% of the maximum thickness at 5% of the tip camber line.

7. The centrifugal impeller of claim 6 wherein the tip edge has less than 10% of the maximum thickness at 5% of the tip camber line.

8. The centrifugal impeller of claim 1 wherein the maximum thickness location is located between 5% and 30% of a hub camber line at the hub.

9. The centrifugal impeller of claim 1 wherein a hub camber line at the hub extends from the inlet edge to the outlet edge, adjacent the hub, immediately above a fillet.

10. The centrifugal impeller of claim 1 wherein thickness of tip is measured at 95% span.

11. The centrifugal impeller of claim 1 wherein the maximum thickness along the 50% span camber line forms part of a bulge, the bulge being elongated, extending generally in an orientation of the span along at least 50% of the span, the bulge being followed, in the orientation of the camber line towards the outlet edge, by a reduction in thickness of at least 5% of the maximum thickness within 8% of the of the length of the camber line.

12. The centrifugal impeller of claim 1 wherein the camber lines further include a 75% span camber line extending at 75% of the span, the blade having, along the 75% span camber line, a thickness reaching at least 40% of the maximum thickness and then reducing by at least 5% of the maximum thickness within 10% of the length of the 75% span camber line.

13. The centrifugal impeller of claim 1 wherein the camber lines further include a 25% span camber line extending at 25% of the span, the blade having, along the 25% span camber line, a thickness reaching at least 80% of the maximum thickness and then reducing by at least 5% of the maximum thickness within 6% of the length of the 25% span camber line.

14. The centrifugal impeller of claim 1 wherein the tip edge continuously increases in thickness by at least 5% of the max thickness within a portion of the first 10% of the length of the tip camber line, the portion having at least 4% of the length of the tip camber line.

15. The centrifugal impeller of claim 14 wherein the tip edge continuously increase in thickness by at least 10% of the max thickness within said portion, said portion having at least 6% of the length of the tip camber line.

16. A gas turbine engine comprising in serial flow communication a compressor section for pressurizing air, a combustor in which the compressed air is mixed with fuel and ignited for generating an annular stream of hot combustion gases, and a turbine section for extracting energy from the combustion gases, the compressor section having a centrifugal impeller comprising a hub and a plurality of blades extending from an axial inlet to a radial outlet and circumferentially interspaced from one another, each of the blades having a span extending from the hub to a tip edge, camber lines extending from an inlet edge to an outlet edge between two opposite faces, including a tip camber line extending along the tip edge and a 50% span camber line extending at 50% of the span, a thickness extending between opposite faces of each blade, a blade of the plurality of blades having a maximum thickness at a maximum thickness location adjacent the hub, the tip edge having, at a location corresponding to 5% of the tip camber line, less than 15% of the maximum thickness, the blade having, along the 50% span camber line, a thickness reaching at least 58% of the maximum thickness at a first location along the 50% span camber line, the thickness reducing by at least 5% of the maximum thickness at a second location along the 50% span camber line, the first location within 10% of a length of the 50% span camber line from the second location.

17. A centrifugal impeller comprising a hub and a plurality of blades extending from an axial inlet to a radial outlet and circumferentially interspaced from one another, each of the blades having a span extending from the hub to a tip edge, camber lines extending from an inlet edge to an outlet edge between two opposite faces, including a tip camber line extending along the tip edge, wherein a thickness of a blade of the plurality of blades at the tip edge continuously increases by at least 5% of a max thickness within a distance extending from the inlet edge to 10% of a length of the tip camber line, the distance being at least 4% of the length of the tip camber line, wherein the blade also has a 50% span camber line extending at 50% of the span, a thickness extending between opposite faces, a maximum thickness at a maximum thickness location adjacent the hub the tip edge having, at a location corresponding to 5% of the tip camber line, less than 15% of the maximum thickness, the blade having, along the 50% span camber line, a thickness reaching at least 58% of the maximum thickness at a first location along the 50% span camber line, the thickness reducing by at least 5% of the maximum thickness to a second location along the 50% span camber line, the first location within 10% of the length of the 50% span camber line from the second location.

18. The centrifugal impeller of claim 17 wherein the tip edge continuously increases in thickness by at least 10% of the max thickness within said distance, said distance having at least 6% of the length of the tip camber line.

19. The centrifugal impeller of claim 17 wherein the maximum thickness along the 50% span camber line forms part of a bulge, the bulge being elongated, extending generally in an orientation of the span along at least 50% of the span, in a mid-span region, the bulge being followed, in the orientation of the camber line towards the outlet edge, by a reduction in thickness of at least 5% of the maximum thickness within 8% of the of the length of the camber line.

* * * * *